(12) United States Patent
Ichikawa et al.

(10) Patent No.: US 9,281,719 B2
(45) Date of Patent: Mar. 8, 2016

(54) HIGH-FREQUENCY POWER DEVICE, POWER TRANSMISSION DEVICE, AND POWER TRANSFER SYSTEM

(75) Inventors: Keiichi Ichikawa, Nagaokakyo (JP); Henri Bondar, Kyoto (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 876 days.

(21) Appl. No.: 13/568,525

(22) Filed: Aug. 7, 2012

(65) Prior Publication Data

US 2013/0002048 A1 Jan. 3, 2013

Related U.S. Application Data

(63) Continuation of application No. PCT/JP2011/003677, filed on Jun. 28, 2011.

(51) Int. Cl.
| | |
|---|---|
| *H01F 27/42* | (2006.01) |
| *H01F 37/00* | (2006.01) |
| *H01F 38/00* | (2006.01) |
| *H02J 17/00* | (2006.01) |

(Continued)

(52) U.S. Cl.
CPC .............. *H02J 17/00* (2013.01); *H02M 5/10* (2013.01); *H04B 5/0012* (2013.01); *H04B 5/0037* (2013.01)

(58) Field of Classification Search
CPC .......... H02J 5/005; H02J 17/00; H02J 7/025; H02J 3/383; H02J 7/0042; H02J 7/0027; H02J 13/0082; H02J 1/00; H02J 1/102; H02J 2001/106; H02J 2009/007; H02J 3/01; H02J 7/0004; H02J 7/0008; H02J 7/00

USPC ................................................... 307/149, 104
See application file for complete search history.

(56) References Cited

U.S. PATENT DOCUMENTS 3,759,104 A * 9/1973 Robinson ..................... 374/177
5,191,302 A * 3/1993 Rossnick ..................... 331/109
(Continued)

FOREIGN PATENT DOCUMENTS

| EP | 1 239 578 A2 | 9/2002 |
|---|---|---|
| EP | 1 239 578 A3 | 9/2003 |

(Continued)

OTHER PUBLICATIONS

PCT/JP2011/003667 Written Opinion dated Sep. 14, 2011.

*Primary Examiner* — Jared Fureman
*Assistant Examiner* — Esayas Yeshaw
(74) *Attorney, Agent, or Firm* — Arent Fox LLP

(57) ABSTRACT

A power transfer system includes a power transmission device and a power reception device which are capacitively coupled to allow electrical conduction therethrough in the manner of alternating current. The power transmission device includes an active electrode, a passive electrode, a step-up transformer, and a high-frequency voltage generating circuit. The power reception device includes an active electrode, a passive electrode, and a load circuit. A divider for voltage division based on load capacitances (C1 and C2) is provided between the active electrode and the passive electrode. The active electrode and the passive electrode have respective equivalent capacitances to ground (Ca and Cp) relative to the ground potential. A ground leakage current Ig is minimized by adjusting the values of the respective capacitances in an equivalent circuit so as to satisfy the relationship: $C2/C1 = Cp/Ca$.

12 Claims, 22 Drawing Sheets

(51) Int. Cl.
  *H02M 5/10* (2006.01)
  *H04B 5/00* (2006.01)

(56) References Cited

U.S. PATENT DOCUMENTS

| | | | |
|---|---|---|---|
| 5,898,909 A * | 4/1999 | Yoshihara et al. | 455/73 |
| 6,144,139 A * | 11/2000 | Noma et al. | 310/316.01 |
| 2008/0231120 A1* | 9/2008 | Jin | 307/104 |
| 2008/0303609 A1* | 12/2008 | Abe et al. | 333/124 |
| 2009/0206675 A1* | 8/2009 | Camurati et al. | 307/104 |
| 2009/0302690 A1* | 12/2009 | Kubono et al. | 307/109 |
| 2012/0038218 A1* | 2/2012 | Ichikawa | 307/97 |

FOREIGN PATENT DOCUMENTS

| | | |
|---|---|---|
| FR | 2875649 A1 | 3/2006 |
| JP | 9-312942 A | 12/1997 |
| JP | 2009-531009 A | 8/2009 |
| JP | 2009-296857 A | 12/2009 |
| JP | 2010-150316 A | 7/2010 |
| JP | 2010-213554 A | 9/2010 |
| JP | 2010-537613 A | 12/2010 |
| WO | WO-2007-107642 A1 | 9/2007 |
| WO | WO-2010-150316 A1 | 12/2010 |
| WO | WO-2010-150317 A1 | 12/2010 |
| WO | WO-2010-150318 A1 | 12/2010 |

* cited by examiner

HIGH-FREQUENCY POWER DEVICE, POWER TRANSMISSION DEVICE, AND POWER TRANSFER SYSTEM

CROSS REFERENCE TO RELATED APPLICATIONS

The present application is a continuation of International application No. PCT/JP2011/003677, filed Jun. 28, 2011, the entire contents of which are incorporated herein by reference.

FIELD OF THE INVENTION

The present invention relates to a high-frequency power device handling high-frequency power, and a power transmission device and a power transfer system which transfer electric power in a noncontact manner.

BACKGROUND OF THE INVENTION

Patent Document 1 discloses a system configured to transfer electric power through capacitive coupling.

The power transfer system described in Patent Document 1 comprises: a power transmission device including a high-frequency high-voltage generator, and a passive electrode and an active electrode which form generating electrodes; and a power reception device including a high-frequency high-voltage load, and a passive electrode and an active electrode which form electromotive electrodes.

The electrodes referred to as "generating electrodes" generate a field. The electrodes referred to as "electromotive electrodes" receive the field.

The passive electrode of the generating electrodes is applied with a lower voltage than the active electrode of the generating electrodes. The passive electrode of the electromotive electrodes is applied with a lower voltage than the active electrode of the electromotive electrodes.

The high-frequency voltage used in this system has a frequency ranging from 10 kHz to 10 MHz and a voltage ranging from 100 V to 10 kV for home appliance devices to several hundred of kilovolts or more for automotive or industrial devices. When the frequency of the high-frequency voltage is within this range, the device does not radiate energy in the form of electromagnetic waves, and an electrostatic field is generated in a surrounding medium because the wavelength (lambda) in the surrounding medium is large enough relative to the size D of the device, or D<<(lambda).

FIG. 1 is a view illustrating the basic configuration of the power transfer system of Patent Document 1. The power transmission device includes a high-frequency high-voltage generator 1, and a passive electrode 2 and an active electrode 3 which form the generating electrodes. The power reception device includes a high-frequency high-voltage load 5, and a passive electrode 7 and an active electrode 6 which form the electromotive electrodes. The active electrode 3 of the power transmission device and the active electrode 6 of the power reception device are surrounded by a high electric field area 4. The power transmission device and the power reception device are capacitively coupled through the generating and electromotive electrodes and the surrounding dielectric medium.

Patent Document 1: National Publication of International Patent Application No. 2009-531009

SUMMARY OF THE INVENTION

The power transfer system of the structure described in Patent Document 1 involves a problem to be described below.

FIG. 2 illustrates the configuration of the high-frequency high-voltage generator 1 shown in FIG. 1. In the configuration illustrated, the high-frequency high-voltage generator comprises a step-up transformer 11 configured to feed a high voltage of high frequency to between the passive electrode 2 and the active electrode 3, and a high-frequency voltage generating circuit 10 configured to apply a high-frequency wave to the transformer 11. Usually, the passive electrode 2 of the power transmission device and the circuit ground of the power transmission device (high-frequency voltage generating circuit 10) are equivalently connected to each other. One terminal of the primary coil of the transformer 11 and one terminal of the secondary coil are commonly connected to a ground of the high-frequency voltage generating circuit 10. The primary coil and the secondary coil of the transformer 11 make an unbalance connection to each other.

In cases where the primary coil and the secondary coil of the transformer 11 make such an unbalance connection to each other, however, a potential difference occurs between the potential of the electric feeder section (primary coil) of the transformer 11 and the circuit ground of the high-frequency voltage generating circuit 10 to cause a ground leakage current which is an unnecessary noise current (common mode current) to pass through the power supply line of the high-frequency voltage generating circuit 10. Such a ground leakage current induces an induced magnetic field therearound. Even when the power transmission device is provided with electrostatic shielding, such an induced magnetic field can not easily suppressed. In addition, this configuration has other problems characteristic thereof to be described below.

FIG. 3A illustrates an electric dipole ED formed of the passive electrode 2, active electrode 3 and high-frequency high-voltage generator 1, and its original dipole size. FIG. 3B illustrates the relationship between the electric dipole ED and a large-capacity conductor (reference ground) GND.

Without elimination of the ground leakage current, the high-frequency high-voltage generator 1 and the passive electrode 2 are equivalently connected to the remote reference ground GND of large capacity via the power supply line, as shown in FIG. 3B. For this reason, the reference ground GND acts as a passive electrode, so that the distance between the active electrode 3 and the passive electrode increases. Therefore, an electric dipole formed of the active electrode 3 and the passive electrode has an equivalent dipole size which is increased to serve as a new equivalent dipole size virtually. That is, at least part of the oscillating current between the opposite electrodes of the electric dipole passes through the power supply line up to the remote ground. For this reason, the effective size of the electric dipole increases, which results in an increased unnecessary electromagnetic field (noise).

In order to keep the electric dipole size substantially equal to the original dipole size shown in FIG. 3A, the potential of the electric feeder section (low voltage coil) of the transformer 11 needs to be equal to the circuit ground potential of the high-frequency voltage generating circuit 10.

To make the potential of the electric feeder section of the transformer 11 equal to the circuit ground potential of the high-frequency voltage generating circuit 10, a transformer for float balance connection is used in such a manner that the secondary coil of the transformer is float balance connected between the power transmission device side active electrode and the power transmission device side passive electrode while the primary coil of the transformer is float balance connected to the high-frequency voltage generating circuit.

FIG. 4 is a diagram of a circuit in which a high impedance divider is connected to opposite terminals of a high-frequency voltage generating circuit 1, with a predetermined dividing point being grounded. When the circuit is completely float balanced, no voltage is generated if the dividing point is open, while no current passes if the dividing point is closed, as shown in FIG. 4. That is, an oscillating current to the reference ground through the power supply line is not generated. This is equal to the absence of the power supply line in the equivalent circuit. Therefore, the electric dipole size is kept small.

However, the equivalent capacitances between electrodes and the ground on the high voltage side and the equivalent stray capacitances between the primary coil and the secondary coil are not usually balanced which allows a ground leakage current to pass. An ideal and a real equivalent circuit of a power transmission device are shown in FIG. 5A-5B.

Accordingly, it is an object of the present invention to provide a high-frequency power device, a power transmission device and a power transfer system which reduce unnecessary ground leakage current passing through the power supply line of the high-frequency voltage generating circuit by balancing the effect of the floating capacitance between one electrode and the ground with that of the floating capacitance between the other electrode and the ground by means of impedance elements connected to the respective electrodes, thereby realizing an occurrence and leakage of unnecessary electromagnetic field suppressed without increasing the effective size of the electric dipole.

A high-frequency power device according to the present invention includes a transformer; a high-frequency voltage generating circuit configured to feed a high-frequency voltage to a primary coil of the transformer, the primary coil forming an electric feeder section; and a divider configured to divide a voltage across opposite terminals of a secondary coil of the transformer or opposite terminals of an element of a circuit associated with the secondary coil at a predetermined voltage ratio, the element being applied with a high voltage.

The divider is preferably a series circuit in which a first impedance element and a second impedance element are connected in series;

The first impedance element is preferably an impedance element connected to the opposite terminals of the secondary coil of the transformer or to a higher potential side of the circuit associated with the secondary coil, while the second impedance element is an impedance element connected to the opposite terminals of the secondary coil of the transformer or to a lower potential side of the circuit associated with the secondary coil. The first impedance element has an impedance represented by Za and the second impedance element has an impedance represented by Zp, the ratio of Za/Zp which is the ratio of the impedance of the first impedance element to the impedance of the second impedance element being substantially equal to the ratio of Cp/Ca which is the ratio of a second equivalent capacitance to ground Cp on the lower potential side to a first equivalent capacitance to ground Ca on the higher potential side.

When the output of the divider is connected to the floating feeder section, this configuration is capable of rendering the potential of the electric feeder section substantially equal to the ground potential. Therefore, it becomes hard for an unnecessary ground leakage current to pass through the power supply line of the high-frequency voltage generating circuit, so that the occurrence and leakage of unnecessary electromagnetic field is suppressed. In addition, the dipole size fails to increase.

A power transfer system comprises according to the present invention includes the high-frequency power device; and a power transmission device and a power reception device which are inductively coupled to each other, wherein the primary coil of the transformer is a power transmission coil disposed in the power transmission device, while the secondary coil of the transformer is a power reception coil disposed in the power reception device.

A power transmission device for use in the power transfer system including the high-frequency power device, and a power transmission device and a power reception device which are capacitively coupled to each other, is characterized in that a power transmission device side active electrode for capacitive coupling is connected to the high potential side, while a power transmission device side passive electrode for capacitive coupling is connected to the lower potential side.

In this power transmission device, for example, the first impedance element is a first load capacitance (C1) between the active electrode and the electric feeder section, while the second impedance element is a second load capacitance (C2) between the passive electrode and the electric feeder section.

The first load capacitance (C1) is either a composite capacitance composed of a capacitive element connected between the active electrode and the electric feeder section and a parasitic capacitance or wholly the parasitic capacitance itself; the second load capacitance (C2) between the passive electrode and the electric feeder section is either a composite capacitance composed of a capacitive element connected between the power transmission device side passive electrode and the electric feeder section and a parasitic capacitance or wholly the parasitic capacitance itself; and at least one of the capacitive elements which are respectively connected between the active electrode and the electric feeder section and between the passive electrode and the electric feeder section includes a variable capacitive element.

This feature makes it possible to easily render the ratio of C2 to C1 substantially equal to the ratio of Cp to Ca by adjusting the value of the capacitance (C1) between the active electrode and the electric feeder section and/or the value of the capacitance (C2) between the passive electrode and the electric feeder section.

The power transmission device can be provided with, for example, a capacitance control circuit configured to detect a ground leakage current passing between the electric feeder section and a circuit ground of the high-frequency voltage generating circuit and control a capacitance of the variable capacitive element based on a result of the detection.

This feature makes it possible to adjust the capacitance ratio to a proper value under actual use conditions.

In the power transmission device, for example, the secondary coil of the transformer is connected between the active electrode and the passive electrode; the electric feeder section is the primary coil of the transformer; the secondary coil of the transformer is provided with a tap; the first impedance element is a first inductor provided between the tap of the secondary coil and a terminal of the secondary coil on the side closer to the active electrode; the second impedance element is a second inductor provided between the tap of the secondary coil and a terminal of the secondary coil on the side closer to the passive electrode; and the first inductor has an inductance represented by La and the second inductor has an inductance represented by Lp, the ratio of La/Lp being substantially equal to the ratio of Cp/Ca which is the ratio of the second equivalent capacitance to ground Cp to the first equivalent capacitance to ground Ca.

The power transmission device preferably further comprises a subsidiary divider which is configured to divide a voltage across opposite terminals of the second inductor and which has a divided voltage output terminal grounded.

In a further configuration of the power transmission device, for example, the subsidiary divider is a series circuit comprising a first resistive element connected between the tap and the divided voltage output terminal and a second resistive element connected between the terminal of the secondary coil on the side closer to the passive electrode and the divided voltage output terminal;

the first inductor has the inductance represented by La and the second inductor has the inductance represented by Lp;

the first resistive element has a resistance value represented by Ra and the second resistive element has a resistance value represented by Rp; and the ratio of $Lp(Rp/(Ra+Rp))$ to $La+Lp(Ra/(Ra+Rp))$ is substantially equal to the ratio of the first equivalent capacitance to ground Ca to the second equivalent capacitance to ground Cp.

In yet a further configuration of the power transmission device, for example, the subsidiary divider is a series circuit comprising a first capacitor connected between the tap and the divided voltage output terminal and a second capacitor connected between the terminal of the secondary coil on the side closer to the passive electrode and the divided voltage output terminal;

the first inductor has the inductance represented by La and the second inductor has the inductance represented by Lp;

the first capacitor has a capacitance represented by CDa and the second capacitor has a capacitance represented by CDp; and the ratio of $Lp(CDa/(CDa+CDp))$ to $La+Lp(CDp/(CDa+CDp))$ is substantially equal to the ratio of the first equivalent capacitance to ground Ca to the second equivalent capacitance to ground Cp.

The power transmission device may further comprise a current detection circuit configured to detect a current passing between the electric feeder section and a circuit ground of the high-frequency voltage generating circuit, wherein the subsidiary divider includes a voltage division ratio control circuit configured to control the voltage division ratio based on a result of the detection by the current detection circuit.

A power transfer system according to the present invention comprises any of the above described power transmission devices, and a power reception device, wherein the power reception device includes a load circuit which receives electric power induced between an active electrode of the power reception device and a passive electrode of the power reception device.

The present invention has the following advantageous effects.

By rendering the output voltage of the divider equal to the ground potential, when the divider output is connected to the floating electric feeder section, the potential of the electric feeder section can be virtually set to the ground potential, thereby making it possible to reduce the unnecessary ground leakage current to the power supply line and suppress the leakage of unnecessary electromagnetic field from the power transmission device.

DESCRIPTION OF THE PREFERRED EMBODIMENTS

First Embodiment

The configuration of a power transfer system according to a First Embodiment will be described with reference to FIGS. 6A, 6B, 6C and 7.

Figure 6A:
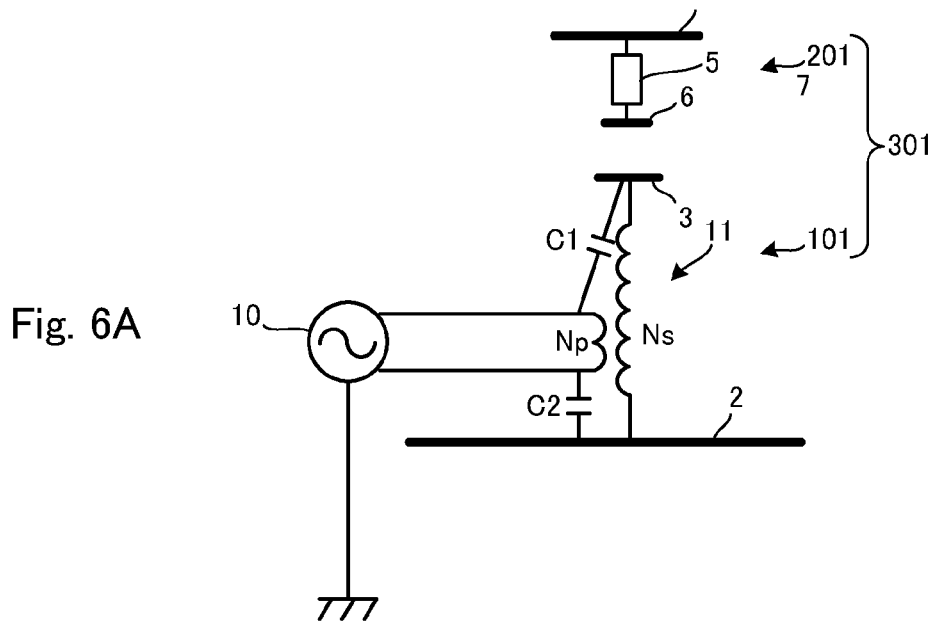
FIG. 6A is a circuit diagram of a power transfer system according to a First Embodiment.
Figure 6B:
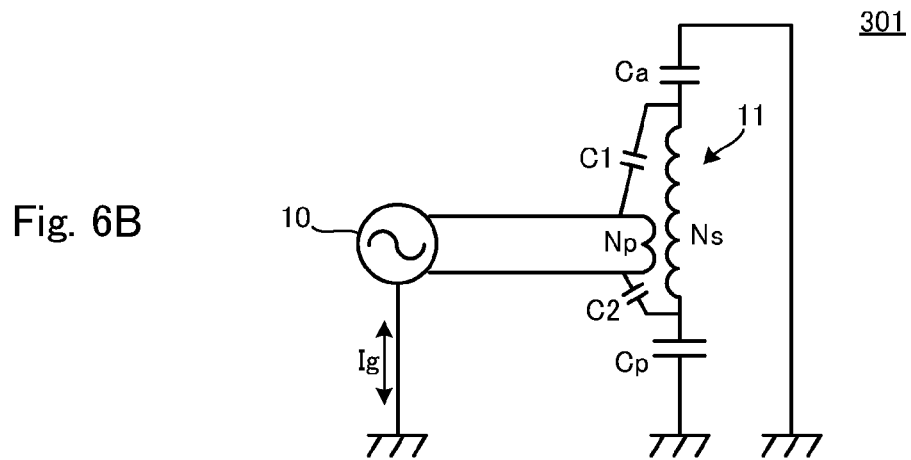
FIG. 6B is an equivalent circuit diagram of the power transfer system according to the First Embodiment.
Figure 6C:
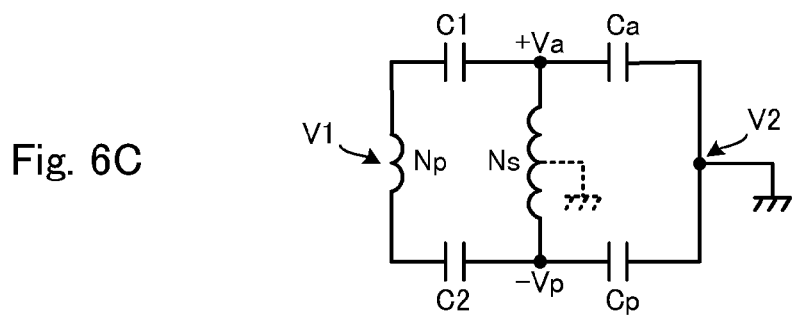
FIG. 6C is a simplified equivalent circuit diagram of the power transfer system according to the First Embodiment.

FIG. 6A is a circuit diagram of the power transfer system according to the First Embodiment; FIG. 6B is an equivalent circuit diagram of the power transfer system; and FIG. 6C is a further simplified equivalent circuit diagram of the power transfer system. The power transfer system 301 comprises a power transmission device 101 and a power reception device 201 which are capacitively coupled to each other through generating electrodes, electromotive electrodes and a surrounding dielectric medium.

The power transmission device 101 includes an active electrode 3, a passive electrode 2, a step-up transformer 11, and a high-frequency voltage generating circuit 10. The step-up transformer 11 has a primary coil forming an electric feeder section and is configured to feed a high voltage of high frequency to between the active electrode 3 and the passive electrode 2. The high-frequency voltage generating circuit 10 applies a high-frequency voltage to a primary coil Np of the step-up transformer 11. The step-up transformer 11 generates a high voltage of high frequency at its secondary coil Ns by being applied at its primary coil Np with the high-frequency voltage from the high-frequency voltage generating circuit 10 and feeds the high voltage of high frequency to between the active electrode 3 and the passive electrode 2.

Electric power is supplied from a common receptacle to the high-frequency voltage generating circuit 10 via an AC adapter or the like. Therefore, the circuit ground of the power transmission device is strongly coupled to an earth ground (i.e., earth).

Ideally, the coupling between the primary side (low voltage side) and the secondary side (high voltage side) of the transformer 11 is made only by magnetic coupling between the primary coil Np and the secondary coil Ns of the transformer 11. Actually, however, an electrostatic capacitance between the coils (parasitic capacitance) and a capacitance between a magnetic core and the coils also couple the primary side and the secondary side of the transformer 11 weakly.

As shown in FIG. 6A, the passive electrode 2 and the circuit ground are not connected directly (in the manner of DC) but are capacitively coupled by load capacitances C1 and C2. The load capacitances C1 and C2 include a parasitic capacitance which is present inherently to the structure (unremovably). The load capacitances C1 and C2 form the "divider" defined by the claims. The load capacitance C1 and the load capacitance C2 are equivalent to the "first impedance element" and the "second impedance element", respectively.

The power reception device 201 comprises an active electrode 6, a passive electrode 7, and a load circuit 5. The load circuit 5 includes a step-down transformer for example and a low-resistance circuit connected as a load.

In the power transmission device 101 and the power reception device 201, their respective active electrodes 3 and 6 are shaped asymmetric with their respective passive electrodes 2 and 7. The active electrodes 3 and 6 are applied with high voltages, while the passive electrodes 2 and 7 applied with relatively low voltages as compared with the active electrodes 3 and 6. Though not shown in FIG. 6A, the active electrodes 3 and 6 and passive electrodes 2 and 7 have their respective surfaces each coated with an insulating layer so as to prevent a conductor surface from being exposed.

FIG. 6B is a diagram of an equivalent circuit under an unloaded condition (i.e., a condition not loaded with the power reception device 201). Though the equivalent capacitance varies when the power reception device 201 is loaded on the power transmission device 101, the principle of the present invention is first described based on the unloaded condition.

In FIG. 6B, an equivalent capacitance to ground Ca is an equivalent capacitance between the active electrode 3 and the ground potential (first equivalent capacitance), and an equivalent capacitance to ground Cp is an equivalent capacitance between the passive electrode 2 and the ground potential (second equivalent capacitance).

On the other hand, the load capacitance C1 is a coupling capacitance between the active electrode 3 and the electric feeder section (i.e., the primary coil Np of the transformer 11), and the load capacitance C2 is a coupling capacitance between the passive electrode 2 and the electric feeder section. Because the high-frequency voltage generating circuit 10 and the primary coil Np of the transformer 11 have low impedances and deal with low voltages of about 10 V, the load capacitance C1 can be regarded as a capacitance between the active electrode 3 and the circuit ground and the load capacitance C2 regarded as a capacitance between the passive electrode 2 and the circuit ground. Therefore, the connection relationship among the capacitances C1, C2, Ca and Cp can be represented as in FIG. 6C. Thus, the active electrode 3 and the passive electrode 2 are considered to have respective equivalent capacitances to ground Ca and Cp with respect to the earth ground (earth). The values of the load capacitances C1 and C2 in this equivalent circuit can be simply adjusted to minimize a ground leakage current Ig.

In FIG. 6C, a voltage V1 of the primary coil (at the midpoint) of the transformer is a voltage obtained by capacitively dividing a voltage across the both ends of the secondary coil Ns of the transformer (+Va)−(−Vp) by the capacitances C1 and C2. Similarly, a voltage V2 at the connection point between the capacitances Ca and Cp is a voltage obtained by capacitively dividing a voltage across the both ends of the secondary coil Ns of the transformer (+Va)−(−Vp) by the capacitances Ca and Cp. The condition for V1=V2 is as follows:

$$C2/C1 = Cp/Ca \quad (1)$$

The left side of the equation (1) represents the ratio of Za/Zp (=C2/C1) which is the ratio of the impedance Za (=1/C1(omega)) of the first impedance element C1 to the impedance Zp (=1/C2(omega)) of the second impedance element C2, where (omega) is called angular frequency; (omega) is equal to frequency multiplied by 2(pi).

Figure 1:
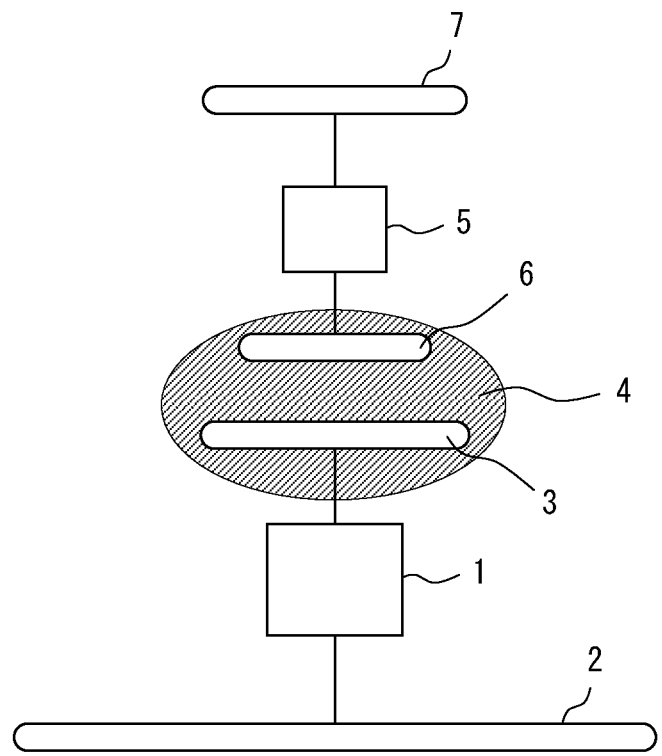
FIG. 1 is a view illustrating the basic configuration of a power transfer system described in Patent Document 1.
Figure 2:
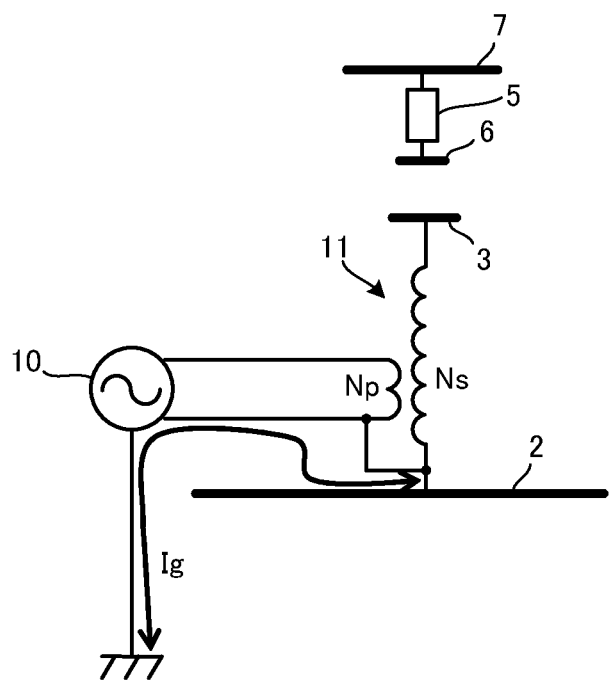
FIG. 2 is a view illustrating the configuration of a high-frequency high-voltage generator 1 shown in FIG. 1.
Figure 3A:
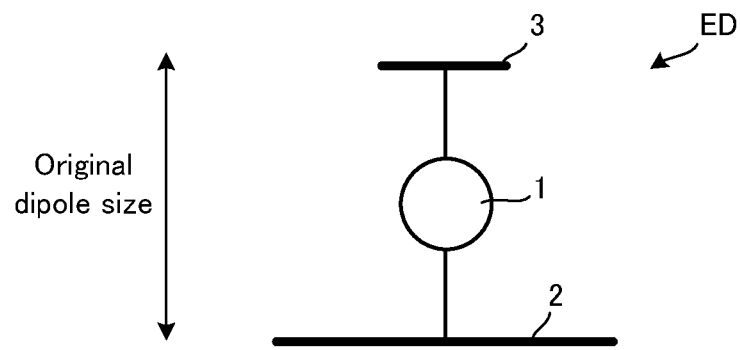
FIG. 3A illustrates an electric dipole ED formed of a passive electrode 2, active electrode 3 and high-frequency high-voltage generator 1 and its original dipole size.
Figure 3B:
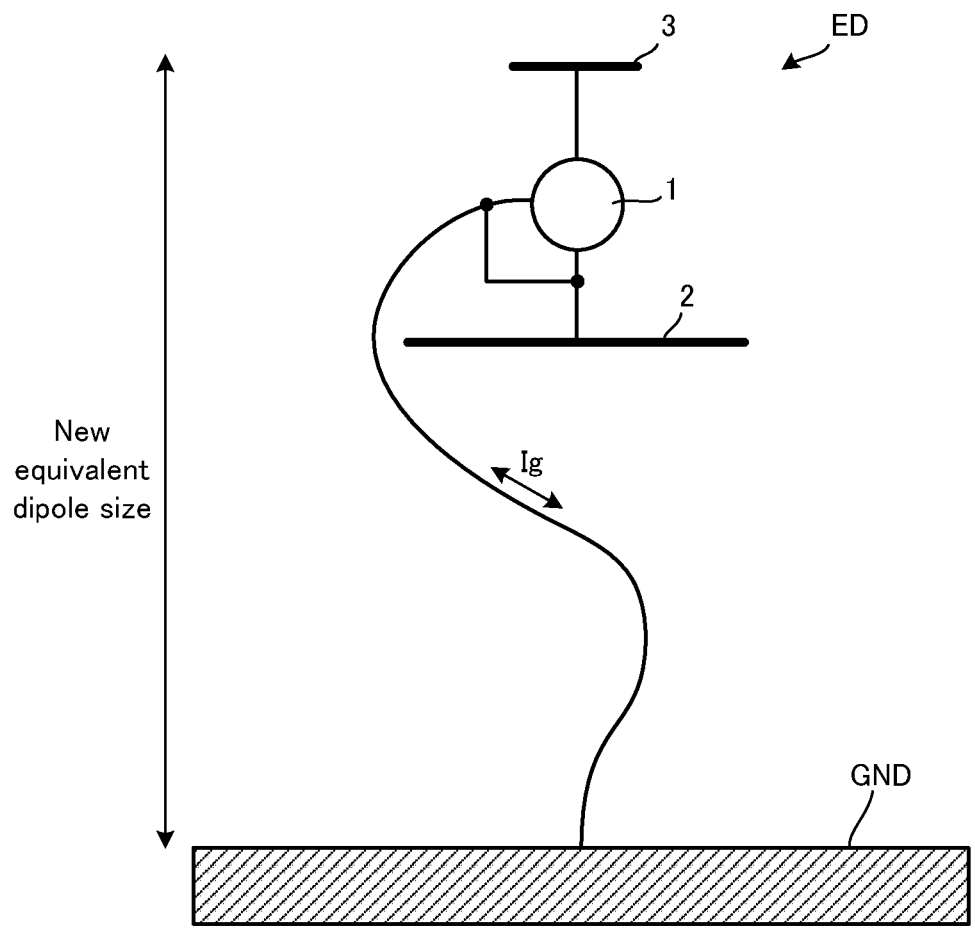
FIG. 3B illustrates the relationship between the electric dipole ED and a large-capacity conductor (reference ground) GND.

Assuming here that: the equivalent capacitances to ground Ca and Cp are 5 pF and 20 pF, respectively (capacitance ratio Cp/Ca=4); the frequency is 300 kHz; and the voltage is 1 kV, the ground leakage current Ig is 9.4 mA when the passive electrode 2 is connected directly to the circuit ground as shown in FIG. 2.

Figure 4:
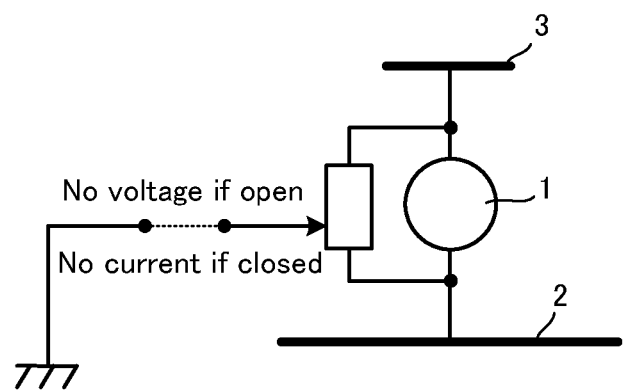
FIG. 4 is a diagram of a circuit in which a high impedance divider is connected to opposite terminals of the high-frequency high-voltage generator 1, with a predetermined dividing point being grounded.
Figure 5A:
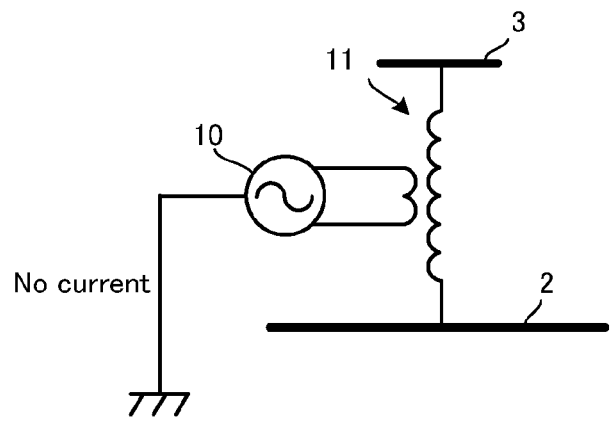
FIG. 5A is an ideal circuit diagram of a power transmission device using a transformer for float balance connection.
Figure 5B:
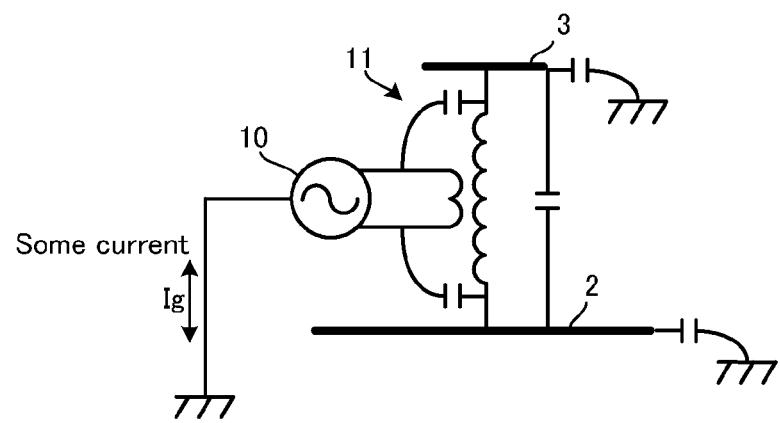
FIG. 5B is a real circuit diagram of the power transmission device in an unbalanced state.
Figure 7:
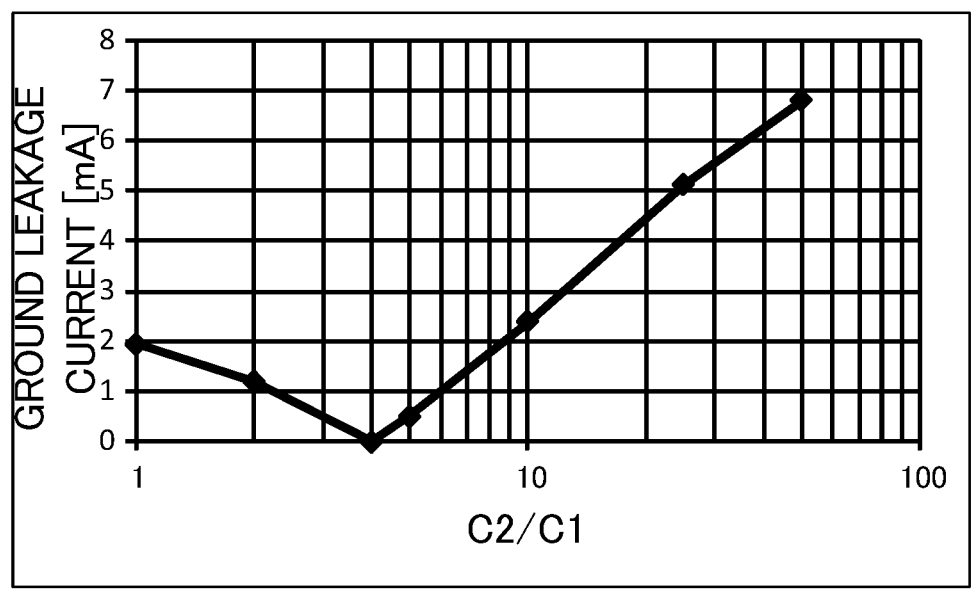
FIG. 7 is a chart plotting results of calculation of a ground leakage current Ig with change in the ratio between load capacitances C1 and C2.

FIG. 7 is a chart plotting results of calculation of the ground leakage current Ig with change in the ratio between load capacitances C1 and C2. As can be seen from FIG. 4, a minimal value (optimum value) of the ground leakage current Ig exists. Specifically, the ground leakage current assumes zero when the capacitance ratio C2/C1 is 4. This ratio is equal to the ratio between the equivalent capacitances to ground Cp/Ca.

In this way, the present invention makes it possible to reduce the ground leakage current Ig by properly setting the load capacitances C1 and C2.

Actually, the current can not necessarily be reduced to zero by the effect of the parasitic capacitance resulting from the structure and the effect of load. Though it is possible that the optimum value of the capacitance ratio C2/C1 is slightly shifted by various perturbations, the optimum value of the capacitance ratio C2/C1 can be simply set depending on different configurations.

Second Embodiment

Figure 8A:
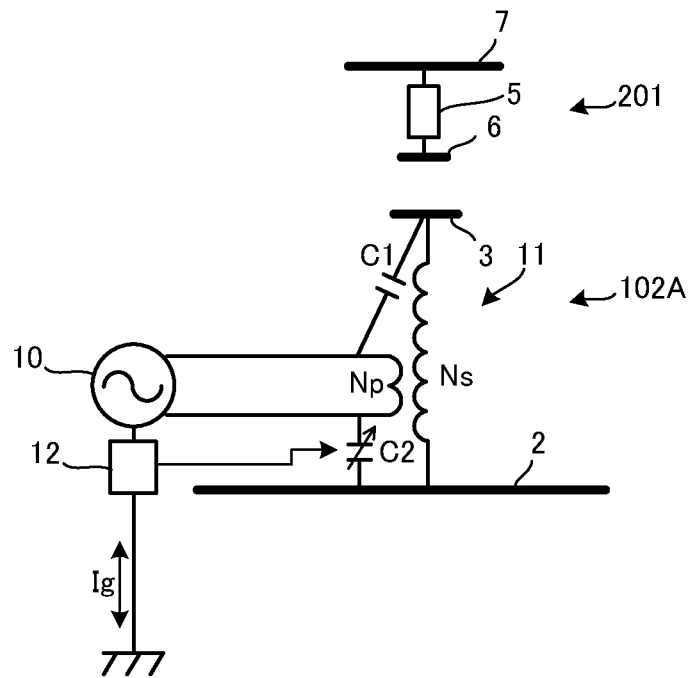
FIG. 8A is an illustration of an exemplary configuration of a first power transfer system according to a Second Embodiment.
Figure 8B:
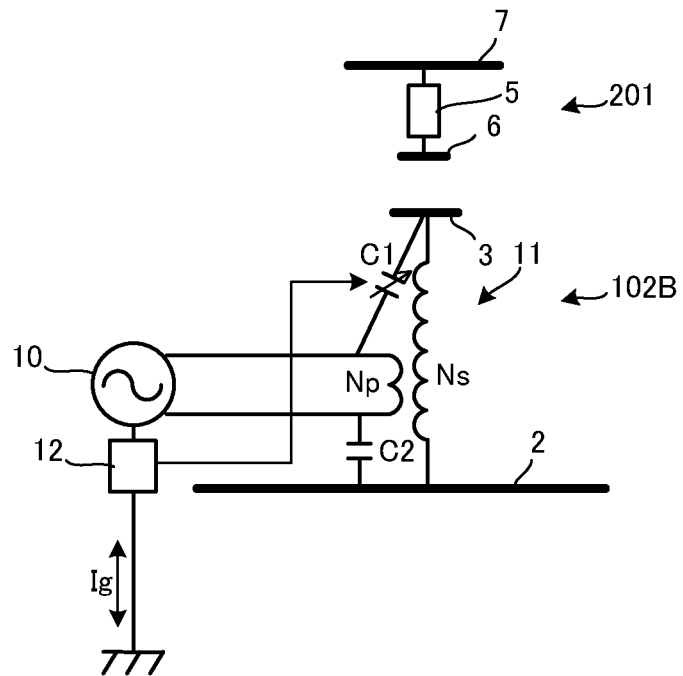
FIG. 8B is an illustration of an exemplary configuration of a second power transfer system according to the Second Embodiment.
Figure 8C:
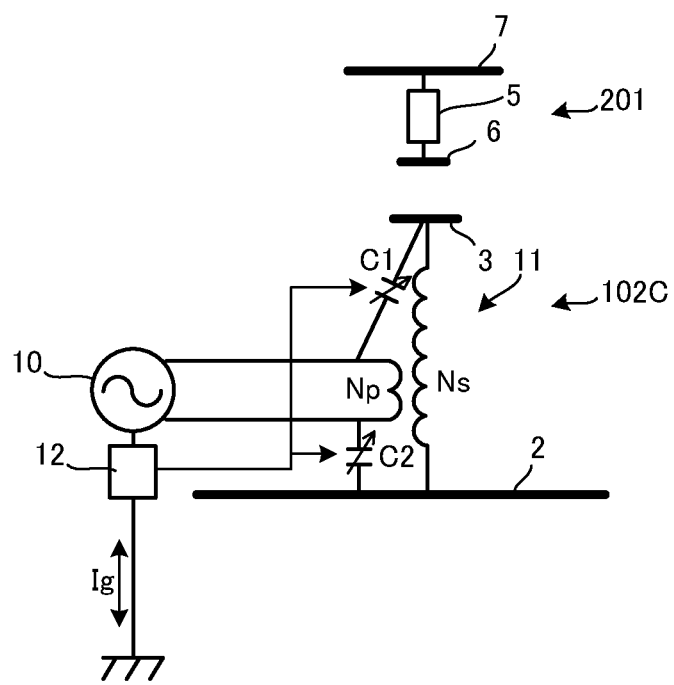
FIG. 8C is an illustration of an exemplary configuration of a third power transfer system according to the Second Embodiment.

FIGS. 8A, 8B and 8C illustrate the configurations of three exemplary power transfer systems according to a Second Embodiment. Any one of these power transfer systems is provided with a current detection and capacitance control circuit 12 in a path through which the ground leakage current Ig passes.

The current detection and capacitance control circuit 12 comprises a circuit configured to detect the ground leakage current Ig (for example a circuit which includes a resistance serially inserted and measures voltages at opposite ends), and a capacitance control circuit configured to vary either or both of the load capacitances C1 and C2 based on the results of the detection.

In the example shown in FIG. 8A, the load capacitance C2 between the passive electrode 2 and the electric feeder section of a power transmission device 102A is formed of a variable capacitive element, while the current detection and capacitance control circuit 12 controls the value of the load capacitance C2.

In the example shown in FIG. 8B, the load capacitance C1 between the active electrode 3 and the electric feeder section of a power transmission device 102B is formed of a variable capacitive element, while the current detection and capacitance control circuit 12 controls the value of the load capacitance C1.

In the example shown in FIG. 8C, the load capacitances C1 and C2 of a power transmission device 102C are both formed of respective variable capacitive elements, while the current detection and capacitance control circuit 12 controls the values of the respective load capacitances C1 and C2.

In cases where a variable capacitive element is incorporated as either or both of the load capacitances C1 and C2, the withstand voltage of the variable capacitive element are determined in view of the insert position and the capacitance value of the variable capacitive element.

The Second Embodiment detects the ground leakage current Ig and performs feedback control so as to reduce the value of the current Ig and hence is capable of follow-up control with changes in load as well as follow-up control with changes in environmental conditions.

Third Embodiment

Figure 9A:
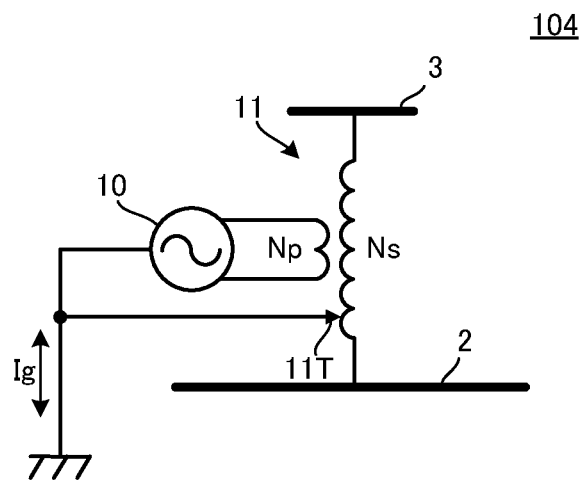
FIG. 9A is a view conceptually illustrating a relevant portion of a power transmission device 104 according to a Third Embodiment.
Figure 9B:
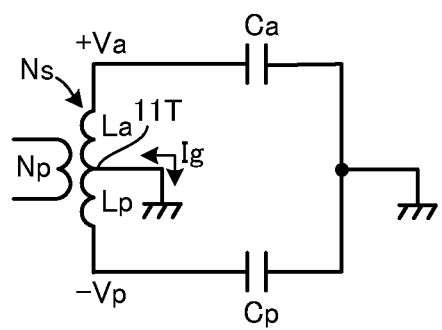
FIG. 9B is an equivalent circuit diagram of the power transmission device 104 according to the Third Embodiment.

FIG. 9A is a view conceptually illustrating a relevant portion of a power transmission device 104 according to a Third Embodiment, and FIG. 9B is an equivalent circuit diagram of the power transmission device 104.

The power transmission device 104 includes the active electrode 3, passive electrode 2, step-up transformer 11, and high-frequency voltage generating circuit 10. The step-up transformer 11 has a primary coil forming an electric feeder section and is configured to feed a high voltage of high frequency to between the active electrode 3 and the passive electrode 2. The high-frequency voltage generating circuit 10 applies a high-frequency voltage to the primary coil Np of the step-up transformer 11. The step-up transformer 11 generates a high voltage of high frequency at its secondary coil Ns by being applied at its primary coil Np with the high-frequency voltage from the high-frequency voltage generating circuit 10 and feeds the high voltage of high frequency to between the active electrode 3 and the passive electrode 2.

The secondary coil Ns of the transformer 11 is provided with a tap 11T which is grounded to a circuit ground of the power transmission device.

In FIG. 9B, the equivalent capacitance to ground Ca is an equivalent capacitance between the active electrode 3 and the ground potential (first equivalent capacitance), and the equivalent capacitance to ground Cp is an equivalent capacitance between the passive electrode 2 and the ground potential (second equivalent capacitance). That coil portion of the secondary coil Ns which extends from the tap 11T to the active electrode 3 has an inductance represented by La, while the other portion of the secondary coil Ns which extends from the tap 11T to the passive electrode 2 has an inductance represented by Lp. The voltage of the tap 11T is a divided voltage obtained by dividing the voltage ((+Va)−(−Vp)) across the opposite terminals of the secondary coil Ns of the transformer 11 by using the inductances La and Lp.

The tap position on the secondary coil Ns shown in FIG. 9A from which the tap 11T extends is variable. By setting the tap position the ratio between the inductances La and Lp is determined. The tap 11T is connected to a ground of the high-frequency voltage generating circuit 10. The inductance ratio of La/Lp is adjusted so that the ground leakage current Ig passing through the grounding line of the high-frequency voltage generating circuit 10 assumes zero. Stated otherwise, the tap position of the tap 11T is simply established so as to minimize the ground leakage current Ig.

Usually, the ground leakage current Ig is minimized when the inductance ratio of La/Lp is substantially equal to the ratio of the second equivalent capacitance to ground Cp to the first equivalent capacitance to ground Ca as expressed by the following equation:

$$La/Lp=Cp/Ca \qquad (3)$$

Fourth Embodiment

Figure 10A:
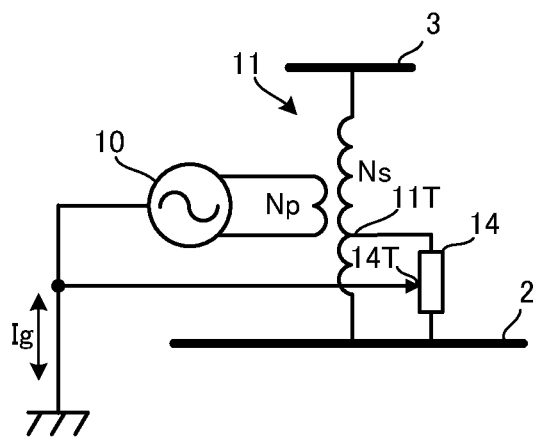
FIG. 10A is a view conceptually illustrating a relevant portion of a power transmission device 105 according to a Fourth Embodiment.
Figure 10B:
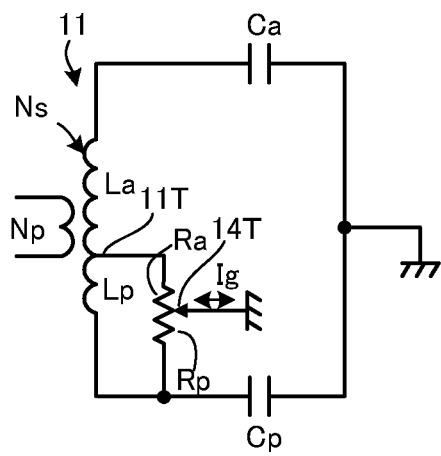
FIG. 10B is an equivalent circuit diagram of the power transmission device 105 according to the Fourth Embodiment.

FIG. 10A is a view conceptually illustrating a relevant portion of a power transmission device 105 according to a Fourth Embodiment, and FIG. 10B is an equivalent circuit diagram of the power transmission device 105.

The power transmission device 105 includes the active electrode 3, passive electrode 2, step-up transformer 11, and high-frequency voltage generating circuit 10. The step-up transformer 11 has a primary coil forming an electric feeder section and is configured to feed a high voltage of high frequency to between the active electrode 3 and the passive electrode 2. The high-frequency voltage generating circuit 10 applies a high-frequency voltage to the primary coil Np of the step-up transformer 11. The step-up transformer 11 generates a high voltage of high frequency at its secondary coil Ns by being applied at its primary coil Np with the high-frequency voltage from the high-frequency voltage generating circuit 10 and feeds the high voltage of high frequency to between the active electrode 3 and the passive electrode 2.

The secondary coil Ns of the transformer 11 is provided with the tap 11T. A subsidiary divider 14 is provided between the tap 11T and the passive electrode 2. The output of the subsidiary divider 14 is grounded to a circuit ground of the power transmission device.

In the example shown in FIG. 10B, the subsidiary divider 14 is a variable resistive element. That coil portion of the secondary coil Ns which extends from the tap 11T to the active electrode 3 has an inductance represented by La, while the other coil portion of the secondary coil Ns which extends from the tap 11T to the passive electrode 2 has an inductance represented by Lp. The value of resistance between the tap 11T side terminal of the variable resistive element and the output terminal 14T is represented by Ra and that of resistance between the output terminal 14T and the passive electrode 2 side terminal is represented by Rp. The voltage division ratio determined by the secondary coil Ns and the subsidiary divider 14 is expressed as follows:

$$\{Lp(Rp/(Ra+Rp))\}/\{La+Lp(Ra/(Ra+Rp))\}.$$

Therefore, the ground leakage current Ig is minimized when the following relationship holds:

$$Ca/Cp=\{Lp(Rp/(Ra+Rp))\}/\{La+Lp(Ra/(Ra+Rp))\} \quad (4)$$

Fifth Embodiment

Figure 11A:
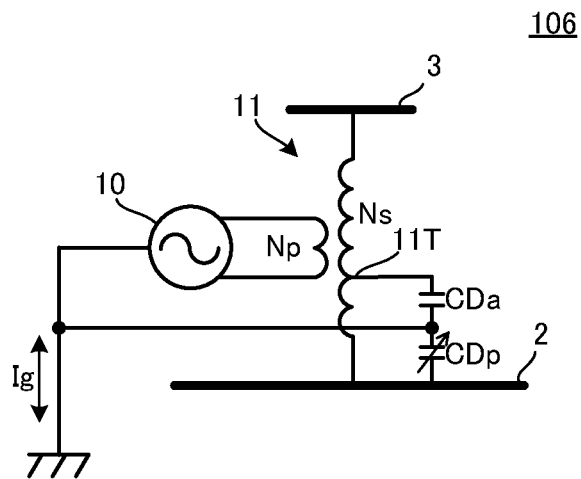
FIG. 11A is a view conceptually illustrating a relevant portion of a power transmission device 106 according to a Fifth Embodiment.
Figure 11B:
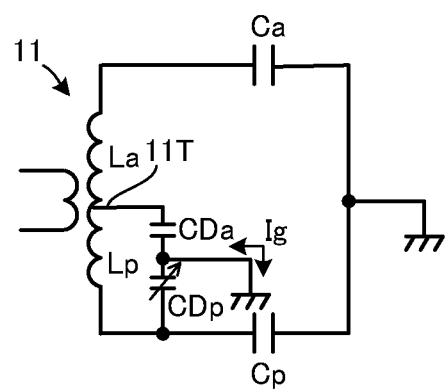
FIG. 11B is an equivalent circuit diagram of the power transmission device 106 according to the Fifth Embodiment.

FIG. 11A is a view conceptually illustrating a relevant portion of a power transmission device 106 according to a Fifth Embodiment, and FIG. 11B is an equivalent circuit diagram of the power transmission device 106.

The Fifth Embodiment is similar to the Fourth Embodiment in that the position of the tap on the secondary coil Ns of the transformer 11 is fixed while the subsidiary divider is provided between the tap and the passive electrode 2. The subsidiary divider used in the Fifth Embodiment is a series circuit comprising a fixed capacitor (first capacitor) CDa and a variable capacitor (second capacitor) CDp. The connection point between the fixed capacitor and the variable capacitor is grounded to a circuit ground of the power transmission device.

That coil portion of the secondary coil Ns which extends from the tap 11T to the active electrode 3 has an inductance represented by La, while the other coil portion of the secondary coil Ns which extends from the tap 11T to the passive electrode 2 has an inductance represented by Lp. The fixed capacitor CDa has a capacitance represented by CDa and the variable capacitor CDp has a capacitance represented by CDp. The voltage division ratio determined by the secondary coil Ns and the subsidiary divider is expressed as follows:

$$\{Lp(CDa/(CDa+CDp))\}/\{La+Lp(CDp/(CDa+CDp))\}.$$

Therefore, the ground leakage current Ig is minimized when the following relationship holds:

$$Ca/Cp=\{Lp(CDa/(CDa+CDp))\}/\{La+Lp(CDp/(CDa+CDp))\} \quad (5)$$

Sixth Embodiment

Figure 12:
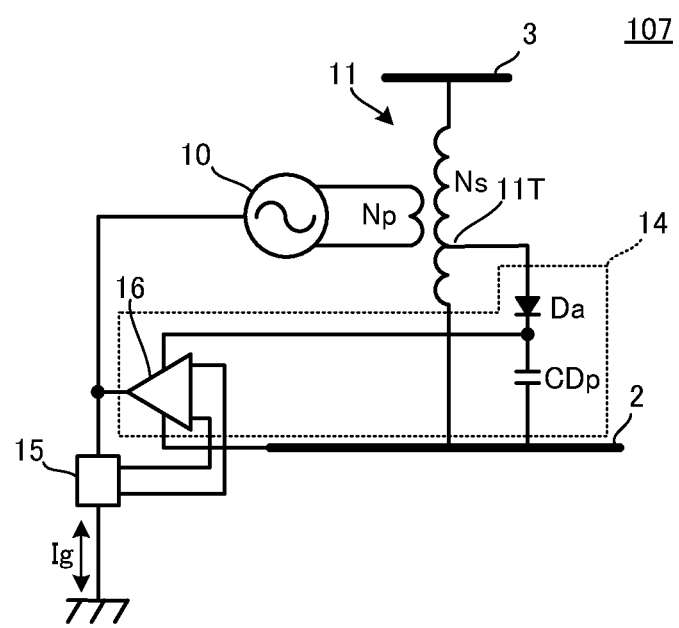
FIG. 12 is a view conceptually illustrating a relevant portion of a power transmission device 107 according to a Sixth Embodiment.

FIG. 12 is a view conceptually illustrating a relevant portion of a power transmission device 107 according to a Sixth Embodiment.

The Sixth Embodiment is similar to the Fourth and Fifth Embodiments in that the position of the tap on the secondary coil Ns of the transformer 11 is fixed while the subsidiary divider is provided between the tap and the passive electrode 2. The subsidiary divider 14 used in the Sixth Embodiment includes a diode Da, capacitor CDp, and operational amplifier 16. The operational amplifier 16 has an output terminal grounded to a circuit ground of the power transmission device.

The current path which allows the ground leakage current Ig to pass therethrough is provided with a current detection circuit 15. The current detection circuit 15 is a common mode rejection coil element for example and is configured to output a small common mode current crossing the two power wires feeding the generator resulting from passage of the ground leakage current through the common mode rejection coil element. The common mode rejection coil is a component consisting of a first and a second windings about a magnetic core in which the differential current generate canceling magnetic fields and equipped with a specific third winding for common mode current detection.

The operational amplifier 16 controls its output voltage by differentially amplifying the output voltage of the current detection circuit 15. The operational amplifier 16 is operated by a charging voltage for the capacitor CDp as its source voltage. Therefore, the output potential of the operational amplifier 16 varies within a voltage range from a minimum potential which is the difference of the potential of the passive electrode 2 and the voltage of the capacitor CDp to a maximum potential which is the potential of the passive electrode 2. The operation of the operational amplifier 16 enables the subsidiary divider 14 to act as a divider capable of varying the voltage division ratio. Feedback control is performed so that the ground leakage current Ig approximates to zero.

In this way, the potential of the electric feeder section can be rendered substantially equal to the ground potential. Therefore, it becomes hard for an unnecessary ground leakage current to pass through the power supply line of the high-frequency voltage generating circuit, so that unnecessary electromagnetic field coupling is suppressed. In addition, since the electric dipole size fails to increase, highly efficiently power transfer can be realized.

Seventh Embodiment

Figure 13:
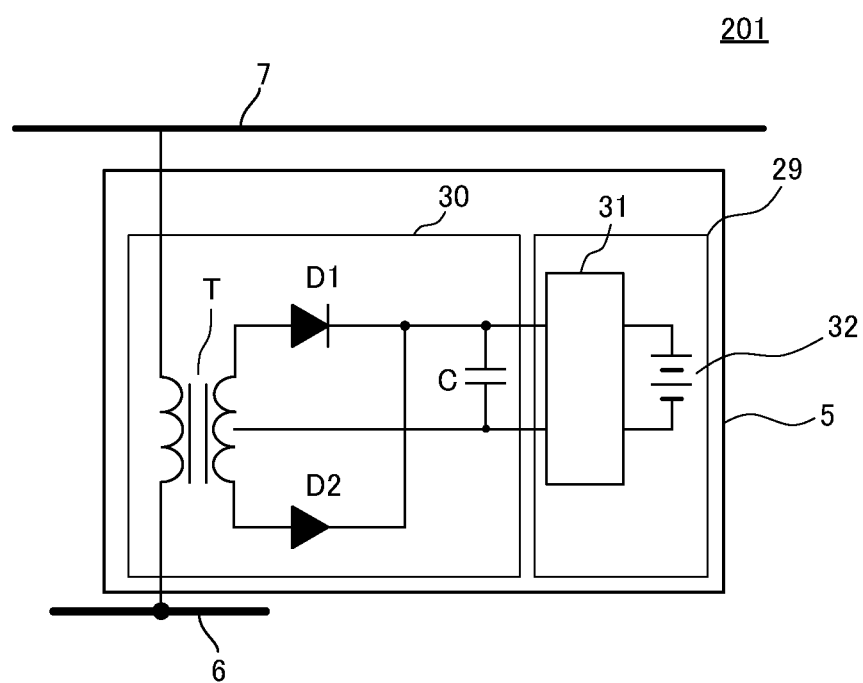
FIG. 13 is a circuit diagram of a power reception device 201 according to a Seventh Embodiment.

A Seventh Embodiment is directed to a specific example of the load circuit 5 provided inside the power reception device 201 of each of the Embodiments described above. FIG. 13 is a circuit diagram of the power reception device 201 according to the Seventh Embodiment.

The load circuit 5 includes a rectifying smoothing circuit 30 and a low-voltage circuit portion 29. The rectifying smoothing circuit 30 includes a step-down transformer T, rectifying diodes D1 and D2, and a smoothing capacitor C. The primary coil of the transformer T has one end connected to the active electrode 6 and an opposite end connected to the passive electrode 7. The secondary coil of the transformer T is formed with a full-wave rectifying circuit comprising the rectifying diodes D1 and D2 and the smoothing capacitor C. The rectifying smoothing circuit 30 may include a resonance circuit. Alternatively, such a resonance circuit may be provided before the rectifying smoothing circuit 30.

In this example, the power reception device 201 forms a noncontact charging device and the low-voltage circuit portion 29 includes a control circuit 31 operated by a voltage rectified and smoothed by the rectifying smoothing circuit 30 that serves as a power source, and a secondary battery 32. The control circuit 31 performs a charging control for the secondary battery 32, a charging control using the secondary battery 32 as a power source, and other predetermined circuit operations.

Eighth Embodiment

Figure 14:
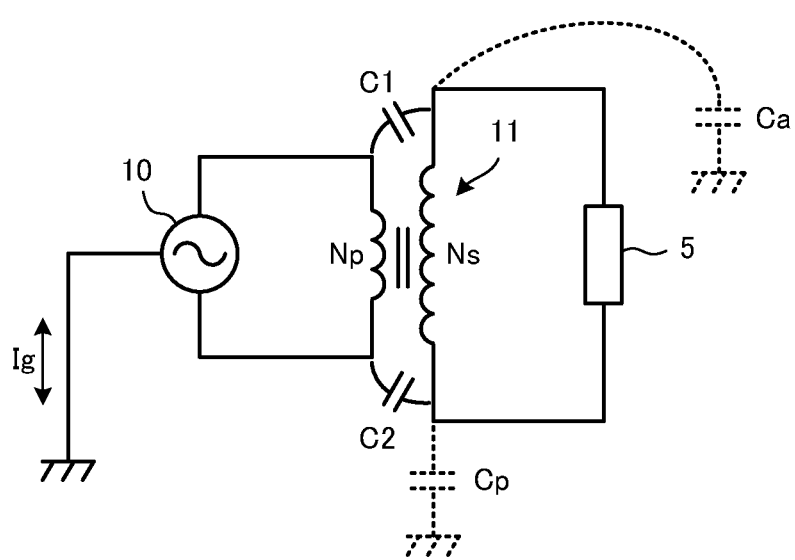
FIG. 14 is a circuit diagram of a high-frequency power device provided with a transformer according to an Eighth Embodiment.

An eighth embodiment is directed to a high-frequency power device provided with a transformer. FIG. 14 is a circuit diagram illustrating a principal portion of the high-frequency power device. The high-frequency power generating circuit 10 applies a high-frequency voltage to the primary coil Np of the transformer 11. The transformer 11 generates a high frequency voltage at its secondary coil Ns by being applied at its primary coil Np with the high-frequency voltage from the high-frequency voltage generating circuit 10. The high-frequency voltage generated at the secondary coil Ns is applied to the load circuit 5.

In FIG. 14, the equivalent capacitance to ground Ca is an equivalent capacitance between the higher potential side of the secondary coil Ns of the transformer 11 and the ground potential (first equivalent capacitance), and the equivalent capacitance to ground Cp is an equivalent capacitance between the lower potential side of the secondary coil Ns of the transformer 11 and the ground potential (second equivalent capacitance).

On the other hand, the load capacitance C1 is a coupling capacitance between the higher potential side of the secondary coil Ns and the electric feeder section (i.e., the primary coil Np of the transformer 11), and the load capacitance C2 is a coupling capacitance between the lower potential side of the secondary coil Ns and the electric feeder section. In the present high-frequency power device provided with the transformer, the values of the load capacitances C1 and C2 can be simply adjusted in accordance with the equivalent capacitances to ground Ca and Cp between the higher potential side of the secondary coil of the transformer and the earth ground (i.e., earth) and between the lower potential side of the secondary coil and the earth ground (i.e., earth) so as to minimize the ground leakage current Ig. The condition therefor is the same as the condition represented by the equation (1).

Ninth Embodiment

Figure 15:
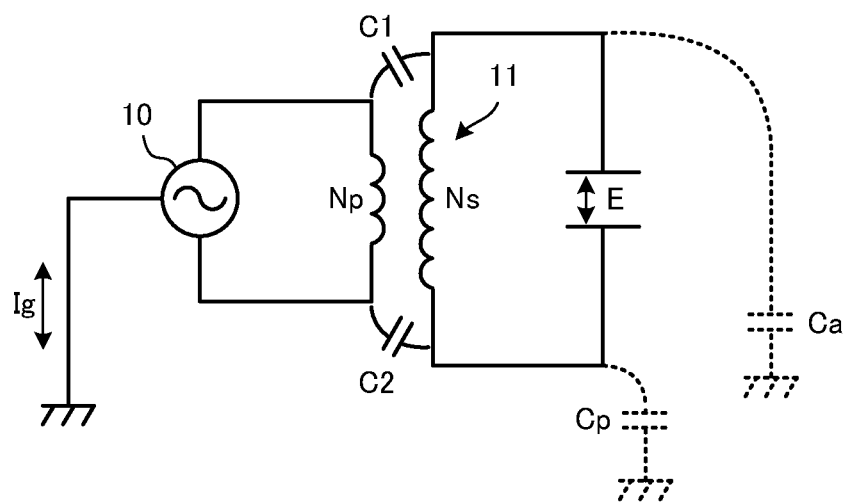
FIG. 15 is a circuit diagram of an electric field generating device provided with a transformer according to a Ninth Embodiment.

A ninth embodiment is directed to an electric field generating device provided with a transformer. FIG. 15 is a circuit diagram of the electric field generating device. The high-frequency power generating circuit 10 applies a high-frequency voltage to the primary coil Np of the transformer 11. The secondary coil Ns of the transformer 11 is connected to opposite electrodes for electric field generation.

In FIG. 15, the equivalent capacitance to ground Ca is an equivalent capacitance between the higher potential side (one of the opposite electrodes) of the secondary coil Ns of the transformer 11 and the ground potential, and the equivalent capacitance to ground Cp is an equivalent capacitance between the lower potential side (the other of the opposite electrodes) of the secondary coil Ns of the transformer 11 and the ground potential.

On the other hand, the load capacitance C1 is a coupling capacitance between the higher potential side of the secondary coil Ns and the electric feeder section (i.e., the primary coil Np of the transformer 11), and the load capacitance C2 is a coupling capacitance between the lower potential side of the secondary coil Ns and the electric feeder section. In the present high-frequency power device provided with the transformer, the values of the load capacitances C1 and C2 can be simply adjusted in accordance with the equivalent capacitances to ground Ca and Cp between the higher potential side of the secondary coil of the transformer and the earth ground (i.e., earth) and between the lower potential side of the secondary coil and the earth ground (i.e., earth) so as to minimize the ground leakage current Ig. The condition therefor is the same as the condition represented by the equation (1).

Tenth Embodiment

Figure 16:
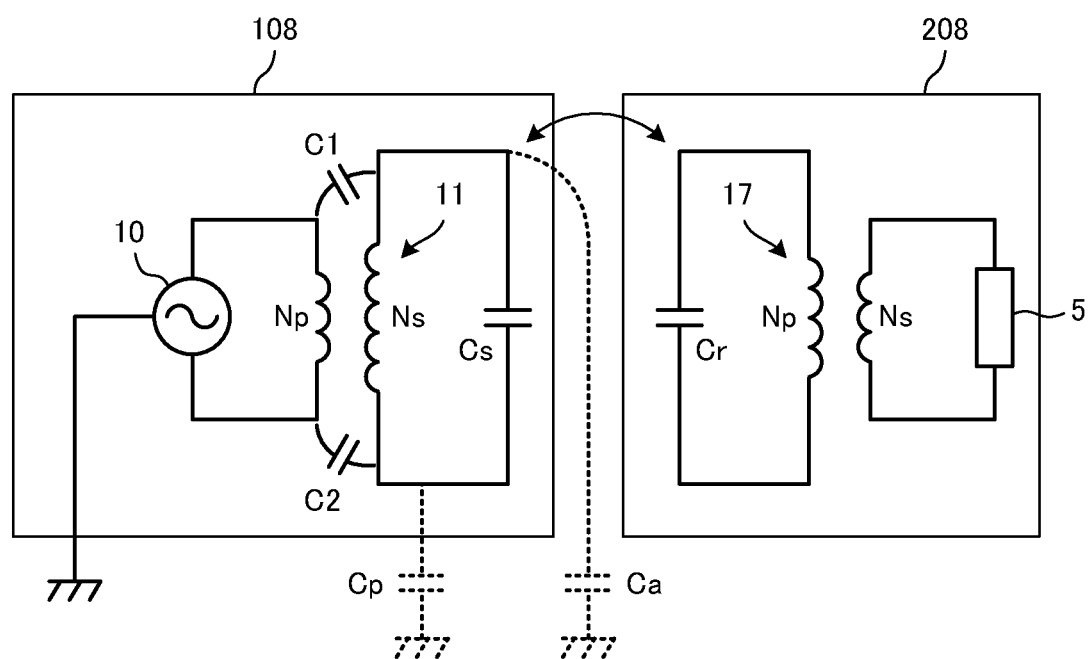
FIG. 16 is a circuit diagram of a capacitive coupling power transfer system according to a Tenth Embodiment.

A tenth embodiment is directed to a capacitive coupling power transfer system. FIG. 16 is a circuit diagram of the power transfer system configured to transfer power by capacitive coupling between resonance circuits. The power transfer system comprises a power transmission device 108 and a power reception device 208. The power transmission device 108 includes a passive electrode and an active electrode which form generating electrodes, and the power reception device 208 includes a passive electrode and an active electrode which form electromotive electrodes. The active electrode of the power transmission device 108 and the active electrode of the power reception device 208 are surrounded by a high electric field area. The capacitance Cs of the power transmission device 108 and the capacitance Cr of the power reception device 208 are capacitively coupled to each other through the generating electrodes, electromotive electrodes and the surrounding dielectric medium.

A coupling factor k is expressed by the following equation using a mutual capacitance CM, capacitance Cs and capacitance Cr:

$$K=CM/SQRT(Cs*Cr)$$

wherein the capacitances Cs and Cr are capacitances respectively connected to the secondary coil Ns of the transformer 11 and the primary coil of the transformer 17 in parallel.

The resonance frequency of the resonance circuit comprising the secondary coil Ns of the transformer 11 and the capacitance Cs and the resonance frequency of the resonance circuit comprising the primary coil Np of the transformer 17 and the capacitance Cr are set substantially equal to each other and, hence, these resonance circuits are capacitively coupled to each other in a resonant state.

In FIG. 16, the equivalent capacitance to ground Ca of the power transmission device 108 is an equivalent capacitance between the active electrode connected to the higher potential side of the secondary coil Ns of the transformer 11 and the ground potential, and the equivalent capacitance to ground Cp is an equivalent capacitance between the passive electrode connected to the lower potential side of the secondary coil Ns and the ground potential. The load capacitance C1 is a coupling capacitance between the higher potential side of the secondary coil Ns and the electric feeder section (i.e., the primary coil Np of the transformer 11), and the load capacitance C2 is a coupling capacitance between the lower potential side of the secondary coil Ns and the electric feeder section. In the present capacitive coupling power transfer system forming the resonance circuits, the values of the load capacitances C1 and C2 can be simply adjusted in accordance with the equivalent capacitances to ground Ca and Cp between the higher potential side of the secondary coil of the transformer and the earth ground (i.e., earth) and between the lower potential side of the secondary coil and the earth ground (i.e., earth) so as to minimize the ground leakage current Ig. The condition therefor is the same as the condition represented by the equation (1).

Eleventh Embodiment

Figure 17:
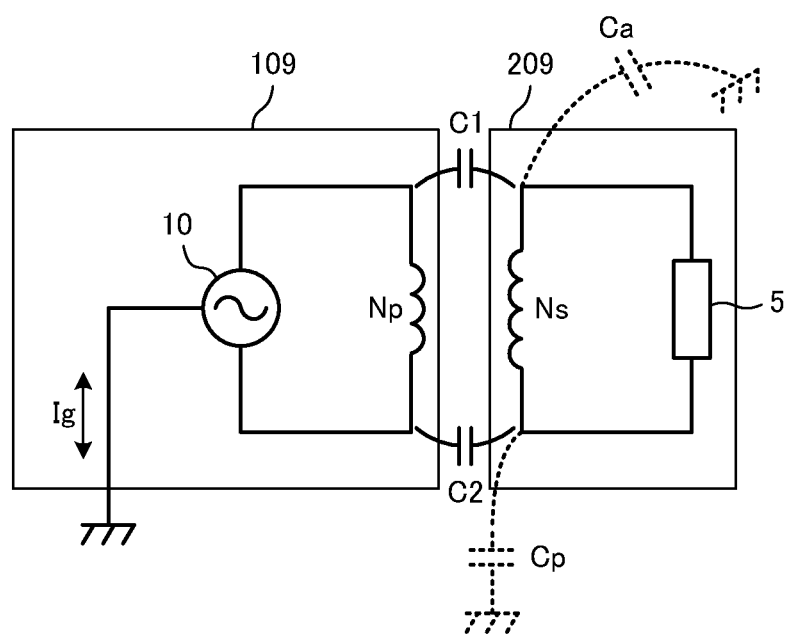
FIG. 17 is a circuit diagram of an inductive coupling power transfer system according to an Eleventh Embodiment.

An eleventh embodiment is directed to an inductive coupling power transfer system. The power transfer system shown in FIG. 17 comprises a power transmission device 109 and a power reception device 209. The power transmission device 109 and the power reception device 209 include a power transfer coil Np and a power reception coil Ns, respectively, which are coupled to each other through a magnetic field.

The equivalent capacitance to ground Ca of the power reception device 209 is an equivalent capacitance between the higher potential side of the power reception coil Ns and the ground potential, and the equivalent capacitance to ground Cp is an equivalent capacitance between the lower potential side of the power reception coil Ns and the ground potential. The load capacitance C1 is a coupling capacitance between the higher potential side of the power reception coil Ns and the electric feeder section (i.e., the power transmission coil Np of the power transmission device), and the load capacitance C2 is a coupling capacitance between the lower potential side of the power reception coil Ns and the electric feeder section. In the present inductive coupling power transfer system forming resonance circuits, the values of the load capacitances C1 and C2 can be simply adjusted in accordance with the equivalent capacitances to ground Ca and Cp between the higher potential side of the power reception coil Ns and the earth ground (i.e., earth) and between the lower potential side of the power reception coil Ns and the earth ground (i.e., earth) so as to minimize the ground leakage current Ig. The condition therefor is the same as the condition represented by the equation (1).

Twelfth Embodiment

Figure 18:
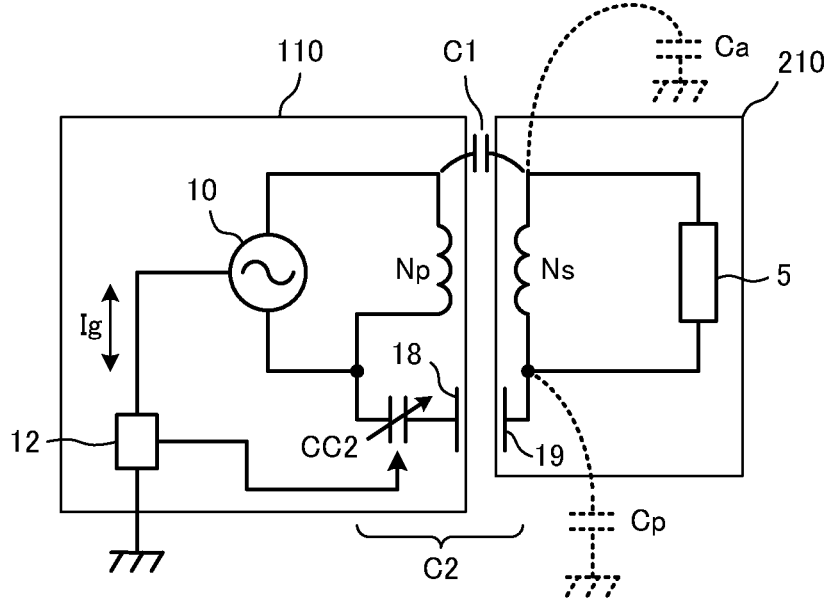
FIG. 18 is a circuit diagram of an inductive coupling power transfer system according to a Twelfth Embodiment.

A twelfth embodiment is directed to an inductive coupling power transfer system configured to automatically adjust the load capacitance C2 so as to minimize the ground leakage current Ig. The power transfer system shown in FIG. 18 comprises a power transmission device 110 and a power reception device 210. The power transmission device 110 and the power reception device 210 include power transfer coil Np and power reception coil Ns, respectively, which are coupled to each other through a magnetic field. The power transmission device 110 and the power reception device 210 are formed with an electrode 18 and an electrode 19, respectively, which are opposed to each other to produce a capacitance.

The power transmission device 110 is provided with a variable capacitor CC2 between the electrode mentioned above and the lower potential side of the power transmission coil Np. The power transmission device 110 also includes a current detection and capacitance control circuit 12 in a path through which the ground leakage current Ig passes. The current detection and capacitance control circuit 12 comprises a circuit configured to detect the ground leakage current Ig and a capacitance control circuit configured to vary the capacitance of the variable capacitor CC2 based on the results of the detection.

Thus, the present inductive coupling power transfer system is capable of reducing the ground leakage current Ig constantly by feedback control of the load capacitance.

Thirteenth Embodiment

Figure 19:
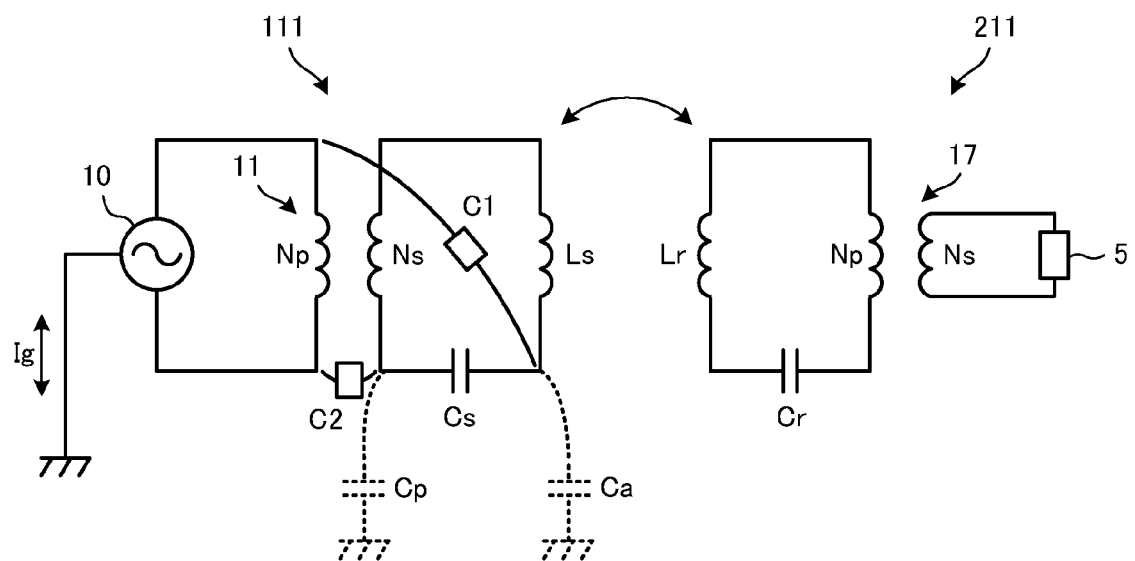
FIG. 19 is a circuit diagram of a power transfer system based on magnetic resonance according to a Thirteenth Embodiment.

A thirteenth embodiment is directed to a power transfer system based on magnetic resonance. The power transfer system shown in FIG. 19 comprises a power transmission device 111 and a power reception device 211. The power transmission device 111 includes high-frequency voltage generating circuit 10 and transformer 11. A resonance coil Ls as a power transmission coil and a resonance capacitor Ls are connected to the secondary coil Ns of the transformer 11. The power reception device 211 includes a resonance coil Lr as a power reception coil, resonance capacitor Cr, transformer 17, and load circuit 5. In the power transmission device 111, the secondary coil Ns of the transformer 11, the resonance coil Ls and resonance capacitor Cs form a resonance circuit. In the power reception device 211, the primary coil Np of the transformer 17, resonance coil Lr and resonance capacitor Cr form a resonance circuit. The resonance circuit of the power transmission device 111 and that of the power reception device 211 are coupled to each other by magnetic resonance.

In the power transmission device 111, a high voltage is applied across the opposite terminals of the resonance capacitor Cs of the circuit (resonance circuit) associated with the secondary coil Ns of the transformer 11. In the power transmission device 111, the load capacitance C1 which is a first impedance element connected to the higher potential side of the resonance capacitor Cs and the load capacitance C2 which is a second impedance element connected to the lower potential side of the resonance capacitor Cs form a divider. The equivalent capacitance to ground Ca is produced between the higher potential side of the resonance capacitor Cs and the earth ground, while the equivalent capacitance to ground Cp is produced between the lower potential side of the resonance capacitor Cs and the earth ground.

In the present power transfer system based on magnetic resonance, the values of the load capacitances C1 and C2 can be simply adjusted in accordance with the equivalent capacitances to ground Ca and Cp between the higher potential side of the resonance capacitor Cs and the earth ground (i.e., earth) and between the lower potential side of the resonance capacitor Cs and the earth ground (i.e., earth) so as to minimize the ground leakage current Ig. The condition therefor is the same as the condition represented by the equation (1).

Fourteenth Embodiment

Figure 20:
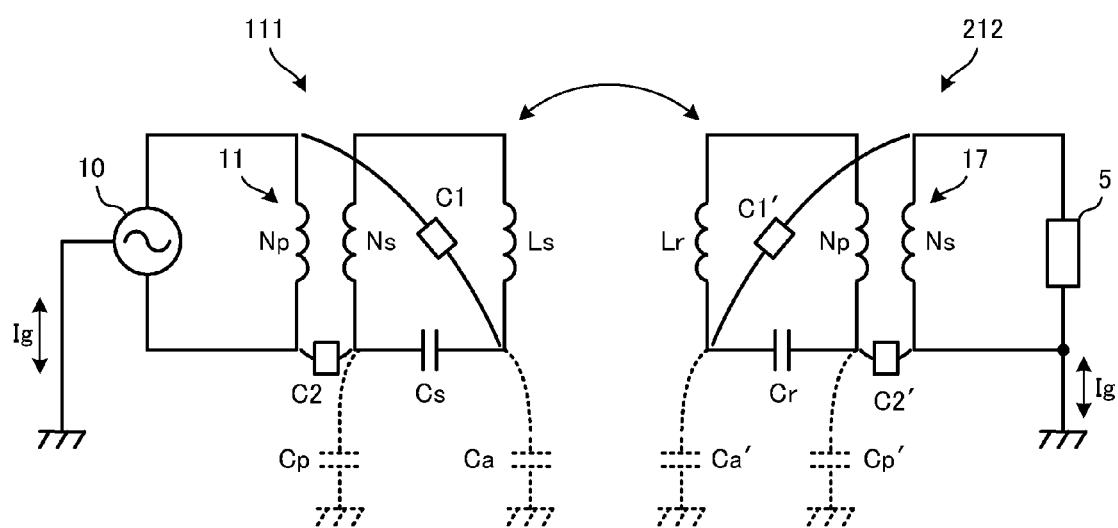
FIG. 20 is a circuit diagram of a power transfer system based on magnetic resonance according to a Fourteenth Embodiment.

A fourteenth embodiment is directed to a power transfer system based on magnetic resonance which is configured to suppress the ground leakage current on the power reception device side. The power transfer system shown in FIG. 20 comprises the power transmission device 111 and a power reception device 212. The power transmission device 111 has the same configuration as that shown in FIG. 19. The power reception device 212 includes resonance coil Lr as a power reception coil, resonance capacitor Cr, transformer 17, and load circuit 5.

In the power reception device 212, a high voltage is applied across the opposite terminals of the resonance capacitor Cr of the circuit (resonance circuit) associated with the primary coil Np of the transformer 17. In the power reception device 212, a load capacitance C1' which is a first impedance element connected to the higher potential side of the resonance capacitor Cr and a load capacitance C2' which is a second impedance element connected to the lower potential side of the resonance capacitor Cr form a divider. An equivalent capacitance to ground Ca' is produced between the higher potential side of the resonance capacitor Cr and the earth ground, while an equivalent capacitance to ground Cp' is produced between the lower potential side of the resonance capacitor Cr and the earth ground.

Even on the power reception device side of the power transfer system based on magnetic resonance, the values of the load capacitances C1' and C2' can be simply adjusted in accordance with the equivalent capacitances to ground Ca' and Cp' between the higher potential side of the resonance capacitor Cr and the earth ground (i.e., earth) and between the lower potential side of the resonance capacitor Cr and the earth ground (i.e., earth) so as to minimize the ground leakage current Ig. The condition therefor is the same as the condition represented by the equation (1).

Other Embodiments

In the capacitive coupling power transfer systems and their power reception devices according to some of the foregoing embodiments, the passive electrode 7 of the power reception device 201 is located away from the power transmission device. However, the shape of the passive electrode 7 of the power reception device 201 is not limited thereto. For example, the passive electrode 7 may be shaped to surround the load circuit 5 and open in the vicinity of the active electrode 6.

REFERENCE SIGNS LIST

C1 ... first load capacitance
C2 ... second load capacitance
C3 ... first equivalent shield electrode capacitance
C4 ... second equivalent shield electrode capacitance
Ca ... first equivalent capacitance to ground
Cp ... second equivalent capacitance to ground
D1,D2 ... rectifying diode
Ig ... ground leakage current
Np ... primary coil
Ns ... secondary coil
T ... transformer
2 ... passive electrode
3 ... active electrode
5 ... load circuit
6 ... active electrode
7 ... passive electrode
10 ... high-frequency voltage generating circuit
11, 17 ... transformer
12 ... current detection and capacitance control circuit
13 ... shield conductor
14 ... subsidiary divider
21 ... casing
29 ... low-voltage circuit portion
30 ... rectifying smoothing circuit
31 ... control circuit
32 ... secondary battery
101,102A,102B,102C,103A,103B ... power transmission device
104 to 111 ... power transmission device
201, 208 to 212 ... power reception device
301,303A,303B ... power transfer system

The invention claimed is:

1. A high-frequency power device comprising:
a transformer;
a high-frequency voltage generating circuit configured to feed a high-frequency voltage to a primary coil of the transformer so that the primary coil forms an electric feeder section; and
a divider configured to divide a voltage across opposite terminals of a secondary coil of the transformer or opposite terminals of an element of a circuit associated with the secondary coil at a predetermined voltage ratio, wherein:
the divider is a series circuit in which a first impedance element and a second impedance element are connected in series;
the first impedance element is an impedance element connected to a first potential side of the opposite terminals of the secondary coil of the transformer or to a first potential side of the circuit associated with the secondary coil, while the second impedance element is an impedance element connected a second potential side of to the opposite terminals of the secondary coil or to a second potential side of the circuit associated with the secondary coil, the first potential side being higher than the second potential side; and
the first impedance element has an impedance represented by Za and the second impedance element has an impedance represented by Zp, a second equivalent capacitance to ground on the second potential side is represented by Cp, a first equivalent capacitance to ground on the first potential side is represented by Ca, and a ratio of Za/Zp is substantially equal to a ratio of Cp/Ca.

2. A power transfer system comprising:
the high-frequency power device according to claim 1; and
a power transmission device and a power reception device which are inductively coupled to each other, wherein the primary coil of the transformer is a power transmission coil disposed in the power transmission device, and the secondary coil of the transformer is a power reception coil disposed in the power reception device.

3. A power transmission device for use in a power transfer system including the high-frequency power device according to claim 1, and a power transmission device and a power reception device which are capacitively coupled to each other, wherein
a power transmission device side active electrode configured for capacitive coupling is connected to the first potential side, while a power transmission device side passive electrode for capacitive coupling is connected to the second potential side.

4. The power transmission device according to claim 3, wherein:
the first impedance element is a first load capacitance between the active electrode and the electric feeder section; and
the second impedance element is a second load capacitance between the passive electrode and the electric feeder section.

5. The power transmission device according to claim 4, wherein:
the first load capacitance is either a composite capacitance composed of a capacitive element connected between the active electrode and the electric feeder section and a parasitic capacitance or the parasitic capacitance itself;
the second load capacitance is either a composite capacitance composed of a capacitive element connected between the passive electrode and the electric feeder section and a parasitic capacitance or the parasitic capacitance itself; and
at least one of the capacitive elements which are respectively connected between the active electrode and the electric feeder section and between the passive electrode and the electric feeder section includes a variable capacitive element.

6. The power transmission device according to claim 5, further comprising a capacitance control circuit configured to detect a current passing between the electric feeder section and a circuit ground of the high-frequency voltage generating circuit and control a capacitance of the variable capacitive element based on a result of the detection.

7. The power transmission device according to claim 3, wherein:
the secondary coil of the transformer is provided with a tap;

the first impedance element is a first inductor provided between the tap of the secondary coil and a terminal of the secondary coil on a side thereof proximal to the active electrode;

the second impedance element is a second inductor provided between the tap of the secondary coil and a terminal of the secondary coil on a side thereof proximal to the passive electrode; and the first inductor has an inductance represented by La and the second inductor has an inductance represented by Lp, the ratio of La/Lp being substantially equal to the ratio of Cp/Ca.

8. The power transmission device according to claim 7, further comprising a subsidiary divider configured to divide a voltage across opposite terminals of the second inductor and which has a divided voltage output terminal that is grounded.

9. The power transmission device according to claim 8, wherein:

the subsidiary divider is a series circuit comprising a first resistive element connected between the tap and the divided voltage output terminal and a second resistive element connected between the terminal of the secondary coil on the side thereof proximal to the passive electrode and the divided voltage output terminal;

the first inductor has the inductance represented by La and the second inductor has the inductance represented by Lp;

the first resistive element has a resistance value represented by Ra and the second resistive element has a resistance value represented by Rp; and the ratio of Lp(Rp/(Ra+Rp)) to La+Lp(Ra/(Ra+Rp)) is substantially equal to the ratio of Ca/Cp.

10. The power transmission device according to claim 8, wherein:

the subsidiary divider is a series circuit comprising a first capacitor connected between the tap and the divided voltage output terminal and a second capacitor connected between the terminal of the secondary coil on the side thereof proximal to the passive electrode and the divided voltage output terminal;

the first inductor has the inductance represented by La and the second inductor has the inductance represented by Lp;

the first capacitor has a capacitance represented by CDa and the second capacitor has a capacitance represented by CDp; and the ratio of Lp(CDa/(CDa+CDp)) to La+Lp(CDp/(CDa+CDp)) is substantially equal to the ratio Ca/Cp.

11. The power transmission device according to claim 8, further comprising a current detection circuit configured to detect a current passing between the electric feeder section and a circuit ground of the high-frequency voltage generating circuit, wherein the subsidiary divider includes a voltage division ratio control circuit configured to control the voltage division ratio based on a result of the detection by the current detection circuit.

12. A power transfer system comprising the power transmission device according to claim 3, and a power reception device, wherein the power reception device includes a load circuit which receives electric power induced between an active electrode of the power reception device and a passive electrode of the power reception device.

* * * * *